United States Patent [19]

Keogh

[11] 4,320,038

[45] * Mar. 16, 1982

[54] FLAME RETARDANT COMPOSITION BASED ON AN ALKYLENE-ALKYL ACRYLATE COPOLYMER, COATED TALC FILLER AND A NON-POLAR FLAME RETARDANT

[75] Inventor: Michael J. Keogh, Bridgewater, N.J.

[73] Assignee: Union Carbide Corporation, New York, N.Y.

[*] Notice: The portion of the term of this patent subsequent to Jan. 6, 1998, has been disclaimed.

[21] Appl. No.: 210,461

[22] Filed: Nov. 25, 1980

Related U.S. Application Data

[63] Continuation-in-part of Ser. No. 33,328, Apr. 25, 1979, Pat. No. 4,255,303, which is a continuation-in-part of Ser. No. 899,563, Apr. 27, 1978, abandoned, which is a continuation-in-part of Ser. No. 800,899, May 26, 1977, abandoned.

[51] Int. Cl.³ .......................... C08K 3/16; C08K 9/04
[52] U.S. Cl. ................................... 523/216; 428/379; 428/461; 524/562; 524/94
[58] Field of Search .................. 428/379, 461; 260/23 AR, 23 H, 42.14, 42.45, 42.46

[56] References Cited

U.S. PATENT DOCUMENTS

| | | | |
|---|---|---|---|
| 2,448,799 | 9/1948 | Happoldt et al. | 260/28.5 A |
| 3,157,614 | 11/1964 | Fischer | 260/42.46 |
| 3,470,122 | 9/1969 | Ridgeway et al. | 260/23 H |
| 3,835,091 | 9/1974 | Roos et al. | 260/42.46 |
| 3,882,061 | 5/1975 | Bontinck et al. | 260/42.46 |
| 4,035,322 | 7/1977 | Tate et al. | 260/42.46 |
| 4,069,190 | 1/1978 | Vostovich | 260/42.45 |
| 4,075,146 | 2/1978 | Kiss | 260/23 H |
| 4,243,579 | 1/1981 | Keogh | 260/23 AR |
| 4,255,303 | 3/1981 | Keogh | 260/23 H |

FOREIGN PATENT DOCUMENTS 700613 12/1964 Canada .......................... 260/42.14

OTHER PUBLICATIONS

Smith et al., EPR for Wire and Cable Insulation, Article in Rubber World, Mar. 1964, pp. 54–65.

*Primary Examiner*—Ronald W. Griffin
*Attorney, Agent, or Firm*—James C. Arvantes

[57] ABSTRACT

The disclosure of this application is directed to a composition of a copolymer of an alkylene-alkyl acrylate, a talc filler coated with a metal salt of a fatty acid and a non-polar flame retardant additive. The compositions of this invention are useful as insulation about electrical conductors, providing insulated electrical conductors which have improved flame retardant properties and improved insulation resistance.

14 Claims, No Drawings

FLAME RETARDANT COMPOSITION BASED ON AN ALKYLENE-ALKYL ACRYLATE COPOLYMER, COATED TALC FILLER AND A NON-POLAR FLAME RETARDANT

This application is a continuation-in-part of my copending application Ser. No. 33,328 filed Apr. 25, 1979, now U.S. Pat. No. 4,255,303, which in turn is a continuation-in-part of application Ser. No. 899,563 filed Apr. 27, 1978, now abandoned, which in turn is a continuation-in-part of application Ser. No. 800,899 filed May 26, 1977, now abandoned.

SUMMARY OF THE INVENTION

This invention relates to compositions, having improved flame retardant properties and improved wet electrical properties, of an alkylene-alkyl acrylate copolymer, a talc filler coated with a metal salt of a fatty acid and a non-polar flame retardant. The compositions of the present invention are particularly useful as insulation about electrical conductors, providing insulated electrical conductors which have improved flame-retardancy and longer working life in a wet environment.

BACKGROUND OF THE INVENTION

Compositions based on olefin polymers, such as polyethylene, have been suggested for use as insulation about electrical conductors. As a general rule, these compositions have been modified by the addition thereto of additives designed to improve the flame retardant properties of the compositions. For example, inorganic fillers exemplified by polar compounds such as aluminum trihydrate, non-calcined clay and the like have been added to compositions, based on olefin polymers, for the express purpose of improving flame retardant properties.

Although the addition of polar compounds to olefin polymer compositions does improve the flame retardant properties thereof, such addition gives rise to other problems. For example, olefin polymer compositions containing polar compounds are adversely affected by moisture. Consequently, when these compositions are extruded as insulation about electrical conductors and the insulated conductors subjected to a wet environment, the insulated conductors have been found to have unstable wet electrical properties. Unstable wet electrical properties are manifested by decreased insulation resistance.

DESCRIPTION OF THE INVENTION

The present invention provides compositions which meet the need of improved flame retardancy while maintaining stable wet electrical properties.

The compositions of the present invention consist essentially of an alkylene-alkyl acrylate copolymer, at least 10 parts by weight, per 100 parts by weight of copolymer, of talc filler coated with a metal salt of a fatty acid having 8 to 20 carbon atoms, wherein the metal is of Group Ia, Group IIa or Group IIb of the Mendeleev Periodic Table of Elements and a non-polar flame retardant additive in a flame retardant amount.

The coated talc filler is generally present in an amount of 10 parts to 150 parts by weight preferably about 25 to 45 parts by weight and the non-polar flame retardant additive in an amount of 0.5 to about 100 parts by weight, preferably about 5 to about 45 parts by weight and most preferably about 5 to about 30 parts by weight, based on 100 parts by weight of alkylene-alkyl acrylate copolymer. The resultant compositions have a dielectric constant (ASTMD-150-74) below 6 and a dissipation factor (ASTMD-150-74) below 0.1.

The alkylene-alkyl acrylate copolymers are known products produced by reacting an alkene with an alkyl acrylate and usually contain about 2 to about 50 percent by weight combined alkyl acrylate.

Suitable alkenes are ethylene, propylene, butene-1 isobutylene, pentene-1, 2-methylbutene-1, 3-methylbutene-1, hexene, heptene-1, octene-1 and the like.

The alkylene moiety of the alkylene-alkyl acrylate copolymers contain from 2 to 18 carbon atoms inclusive, preferably 2 to 3 carbon atoms inclusive.

Suitable alkyl acrylate monomers which are copolymerized with the alkenes fall within the scope of the following formula:

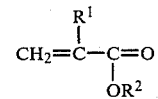

wherein $R^1$ is hydrogen or methyl and $R^2$ is alkyl having one to 8 carbon atoms inclusive. Illustrative compounds encompassed by this formula are: methyl acrylate, ethyl acrylate, methyl methacrylate, n-butyl acrylate, t-butyl acrylate, n-butyl methacrylate, 2-ethylhexyl acrylate and the like.

Alkylene-alkyl acrylate copolymers generally have a density (ASTMD 1505) with a conditioning as in ASTMD-1237 of 44 psi tested pressure) of about 0.5 to about 500 decigrams per minute.

For purposes of the present invention, the preferred copolymer is ethylene-ethyl acrylate, generally having about three to about 40 percent by weight combined ethyl acrylate, preferably having about 5 to about 20 percent by weight combined ethyl acrylate. Combined alkyl acrylate is conveniently determined by infrared analysis.

As to the metal salts of the fatty acids, the metal component of the salts of the fatty acids fall in Group Ia, IIa or IIb of the Mendeleev Periodic Table of Elements. Acids used to form the metal salts are saturated or unsaturated monobasic or dibasic, branched or straight chain fatty acids of 8–20 carbon acids. Such atoms that may be included within the practice of this invention, but are not limited thereto, are palmitic, stearic, lauric, oleic, sebacic, ricinoleic, palmitoleic and the like. The preferred acid is stearic acid while the preferred metal salts are calcium stearate and zinc stearate. The talc filler may be coated by mixing the talc, metallic salt of fatty acid, and ethylene polymer together in a mixer. Preferably, however, the talc filler is precoated with metallic salt of fatty acid by known techniques prior to mixing the talc with ethylene polymer.

The non-polar flame retardant additives, that is, compounds which do not generate acidic materials in the presence of water are exemplified by halogenated (brominated or chlorinated) organic compounds. The preferred halogenated organic compounds include chlorinated polyethylene, polyvinyl chloride, polyvinylidene chloride, polyvinyl chloride copolymers, halogenated paraffin waxes, chlorinated alicyclic hydrocarbons, and brominated aromatic compounds. The most preferred include decabromodiphenyl oxide and compounds of the following formula:

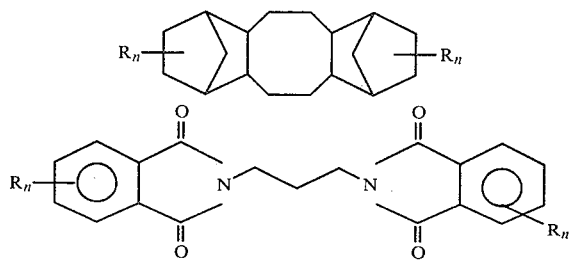

wherein R is independently chlorine or bromine and n is an integer from 1 to 6 exemplified by ethylene(bis-tetrabromophthalimide).

The compositions of the present invention can contain other additives, as is well known in the art, depending upon the ultimate use of the composition, as more fully described in my copending application Ser. No. 33,328 filed Apr. 25, 1979. For example, the compositions can contain peroxides to cure the compositions to crosslinked products, generally on the order of about 0.05 to 4.0 percent by weight; antioxidants, light stabilizers, lubricants such as calcium or zinc stearate, coupling agents such as organo silanes; conductive carbon blacks as well as other additives commonly used in moldable compositions, curable compositions, compositions to be extruded into film material, compositions to be used as coatings, adhesives and the like, these additives being disclosed in my copending application Ser. No. 33,328 filed Apr. 25, 1979 now U.S. Pat. No. 4,255,303, the disclosure of which is incorporated herein by reference.

The compositions of the present invention are conveniently prepared by blending or compounding the components thereof in a suitable apparatus. The ethylene polymer and the other components may be blended together by any of the techniques used in the art to blend and compound thermoplastics to homogeneous masses. Prior to or during the blending of the components together, the calcium or magnesium salt may be coated by known techniques. As regards blending, the components may be fluxed on a variety of apparatus including multi-roll mills, screw mills, continuous mixers, extruders and Banbury mixers.

When all the solid components of the compositions are available in the form of a powder, or as small particles, the compositions are most conveniently prepared by first making a blend of the components, for instance, in a Banbury mixer or continuous extruder, and then masticating this blend on a heated mill, for instance, a two-roll mill, and the milling continued until an intimate mixture of the components is obtained.

In those instances wherein the copolymer is not available in powder form, the compositions may be prepared by introducing the copolymer to a two-roll mill, masticating it until it forms a band around roll, after which a blend of the remaining components is added and the milling continued until an intimate mixture is obtained. The rolls are preferably maintained at a temperature which is within the range of 80° C. to 135° C. and which is below the decomposition temperatures of the peroxide compound(s) if such are used. The composition, in the form of a sheet, is removed from the mill and then brought into a form, typically disc-like pieces, suitable for subsequent processing.

The compositions may then be extruded onto a wire or cable, or other substrate. If the compositions of the present invention, are chemically curable, they are extruded onto the wire or cable, or other substrate and vulcanized at elevated temperatures of about 180° C. and preferably at 200° C.–230° C. using conventional vulcanizing procedures.

The following examples are illustrative of the present invention and are not intended to limit the scope thereof in any manner.

Compositions were prepared by admixing components, identified in Table 1, in a 40 gram Brabender mixer which had been preheated to a temperature of 120° C., for about five minutes. After the five minute period, the contents of the Brabender were discharged, hot, flattened in a press and allowed to cool.

Samples of each composition were used to prepare test plaques, having dimensions of 3 inches by 8 inches by 0.125 inch, in a press under the following conditions: Pressure—5000 psi Temperature—180° C. Time cycle—15 minutes.

Plaques were then subjected to the Limiting Oxygen test ASTMD-2863-70, which is an indication of flame retardant properties. The higher the value, the better the flame retardant properties.

TABLE 1

| | PERCENT BY WEIGHT | | | | | |
| --- | --- | --- | --- | --- | --- | --- |
| | Example 1 | Control 1 | Control 2 | Control 3 | Control 4 | Control 5 |
| Copolymer of ethylene-ethyl acrylate containing 15 percent by weight ethyl acrylate - melt index - 1.6 | 57.6 | — | 97.6 | — | 57.6 | — |
| Copolymer of ethylene-vinyl acetate containing 10 percent by weight combined vinyl acetate - melt index - 2.0 | — | 57.6 | — | 97.6 | — | 57.6 |
| Talc coated with zinc stearate (one percent zinc stearate) | 25.7 | 25.7 | — | — | 40.7 | 40.7 |
| Di-α-cumyl peroxide | 1.7 | 1.7 | 2.4 | 2.4 | 1.7 | 1.7 |
| Ethylene (Bis-tetrabromophthalimide) - non-polar flame retardant additive | 15 | 15 | — | — | — | — |
| Limiting Oxygen Index | 24.9 | 21.8 | 18 | 18.5 | 20.1 | 19.4 |

A composition, the formulation of which is described below, was extruded onto a No. 14 AWG solid copper wire to a thickness of 30 mils, the coating cured at a temperature of 210° C. for 2–3 minutes. Sections of the wire were immersed in water, which was at a temperature of 75° C., and tested for water sensitivity by determination of insulation resistance according to the procedure described in Underwriters Laboratory Subject 44, Nov. 24, 1969.

As can be seen from the test data, insulation resistance increased the longer the coated wire remained immersed in the water.

EXAMPLE 2

| Composition | Parts by Weight |
| --- | --- |

| | -continued |
|---|---|
| Copolymer of ethylene-ethyl acrylate (same as in Example 1) | 52.9 |
| Talc coated with zinc stearate (same as in Example 1) | 29.5 |
| Ethylene(bis-tetrabromophthalimide) | 14.9 |
| 1,2-Dihydro-2,3,4-trimethyl quinoline (antioxidant) | 0.7 |
| Di-α-cumyl peroxide | 1.8 |
| Hindered phenol (light stabilizer sold by American Cyanamide Co. under the designation UV 531) | 0.2 |

| Time | Insulation Resistance-Megohms per 1000 feet-average of two sections |
|---|---|
| 24 hours | 36 |
| 1 week | 36 |
| 2 weeks | 88 |
| 4 weeks | 120 |
| 6 weeks | 140 |
| 8 weeks | 144 |
| 10 weeks | 172 |

What is claimed is:

1. A composition consisting essentially of a copolymer of an alkylene-alkyl acrylate, at least 10 parts by weight, per 100 parts by weight of said copolymer, of a talc filler coated with a metal salt of a fatty acid having 8 to 20 carbon atoms, wherein the metal is of Group Ia, IIa or IIb of the Mendeleev Periodic Table of Elements and a flame-retardant amount of a non-polar flame retardant.

2. A composition consisting essentially of a copolymer of an alkylene-alkyl acrylate, at least 10 parts by weight, per 100 parts by weight of said copolymer, of a talc filler coated with a metal salt of a fatty acid having 8 to 20 carbon atoms, wherein the metal is of Group Ia, IIa or IIb of the Mendeleev Periodic Table of Elements and at least 0.5 to about 100 parts by weight, per 100 parts by weight of alkylene-alkyl acrylate copolymer, of a non-polar flame retardant additive.

3. A composition as defined in claim 2 wherein the coated talc is present in an amount of 10 parts by weight to 150 parts by weight and the non-polar flame retardant additive is present in an amount of about five parts by weight to about 45 parts by weight.

4. A composition as defined in claim 2 wherein the coated talc is present in an amount of 25 parts by weight to 45 parts by weight and the non-polar flame retardant additive is present in an amount of about 5 parts by weight to about 30 parts by weight.

5. A composition as defined in claim 2 wherein the copolymer is a copolymer of ethylene-ethyl acrylate.

6. A composition as defined in claim 2 wherein the talc filler is coated with zinc stearate.

7. A composition as defined in claim 2 wherein the non-polar flame retardant is ethylene(bis-tetrabromophthalimide).

8. A composition as defined in claim 2 wherein the ethylene polymer is a copolymer of ethylene-ethyl acrylate, the talc filler is coated with zinc stearate and the non-polar flame retardant is ethylene(bis-tetrabromophthalimide).

9. A composition as defined in claim 2 having carbon black present therein.

10. A composition as defined in claim 2 having a peroxide present therein.

11. A composition as defined in claim 2 having an anti-oxidant present therein.

12. A composition defined in claim 2 having a peroxide and anti-oxidant present therein.

13. The cured product of the composition defined in claim 2.

14. An electrical conductor having as insulation thereon the composition of claim 2 or the cured product thereof.

* * * * *

UNITED STATES PATENT AND TRADEMARK OFFICE
CERTIFICATE OF CORRECTION

PATENT NO. : U.S. 4,320,038
DATED : March 16, 1982
INVENTOR(S) : Michael J. Keogh It is certified that error appears in the above—identified patent and that said Letters Patent is hereby corrected as shown below:

Column 2, line 50; "atoms" should read --acids--. Column 3, line 2; "formula" should read --formulae--; line 45; "coated" should read --applied as coatings--. Claim 8, line 2; "ethylene polymer" should read --copolymer--.

Signed and Sealed this

Fourteenth Day of September 1982

[SEAL]

Attest:

GERALD J. MOSSINGHOFF

Attesting Officer

Commissioner of Patents and Trademarks